United States Patent [19]

Dreulle et al.

[11] 4,054,638
[45] Oct. 18, 1977

[54] PROCESS FOR TREATING RESIDUES FROM THE ELECTROLYTIC PROCESSING OF ZINC, BY RECOVERY OF THE METALS THEREIN

[75] Inventors: Noël Dreulle, Douai; Alain Fould, Meudon, both of France; Hervé Masson, Tokai, Japan

[73] Assignees: Compagnie Royale Asturienne des Mines; Commissariat a l'Energie Atomique (C.E.A.), both of Paris, France

[21] Appl. No.: 722,264

[22] Filed: Sept. 10, 1976

[30] Foreign Application Priority Data

Sept. 26, 1975 France .................. 75.29484

[51] Int. Cl.² .................. C01G 3/04; C01G 5/00; C01G 21/16
[52] U.S. Cl. .................. 423/39; 423/34; 423/94; 423/98; 423/104; 423/109; 423/139; 423/150; 204/119
[58] Field of Search .................. 423/35, 37, 32, 38, 423/98, 104, 109, 139, 150, 494, 34; 75/114, 120; 204/119

[56] References Cited

U.S. PATENT DOCUMENTS

| | | | |
|---|---|---|---|
| 1,265,547 | 5/1918 | Sulman | 423/494 |
| 1,565,703 | 12/1925 | Elmore | 423/109 |
| 3,493,365 | 2/1970 | Pickering | 75/120 |
| 3,969,107 | 7/1976 | Lippert | 75/120 |
| 4,016,054 | 4/1977 | Gandon et al. | 423/139 |

OTHER PUBLICATIONS

Chemical Abstracts, vol. 77, No. 51375y, (1972).

*Primary Examiner*—O. R. Vertiz
*Assistant Examiner*—Brian E. Hearn
*Attorney, Agent, or Firm*—Young & Thompson

[57] ABSTRACT

A process for the re-utilization of the sulphate residues from the electrolytic treatment of zinc.

The residues are digested hot with concentrated HCl in the presence of $CaCl_2$. $PbCl_2$ crystallizes on cooling. $FeCl_3$ is extracted with TBP circulating in the direction of a series of columns and $FeCl_3$ is extracted in a first column, washed in a second column and re-extracted a third column. The solution which issues is treated with $NH_3$, resulting in precipitation of the majority of the hydroxides of the metals contained therein, which are subsequently separated, while Ag, Zn and Cu are complexed. Ag is precipitated with $(NH_4)_2S$. $NH_3$ is recovered by means of lime. $CaCl_2$ is re-cycled to the start of the process and Cu and Zn are leached together with the mineral.

Application of the process to the recovery of the metals contained in the residues from the digestion of blends.

14 Claims, 1 Drawing Figure

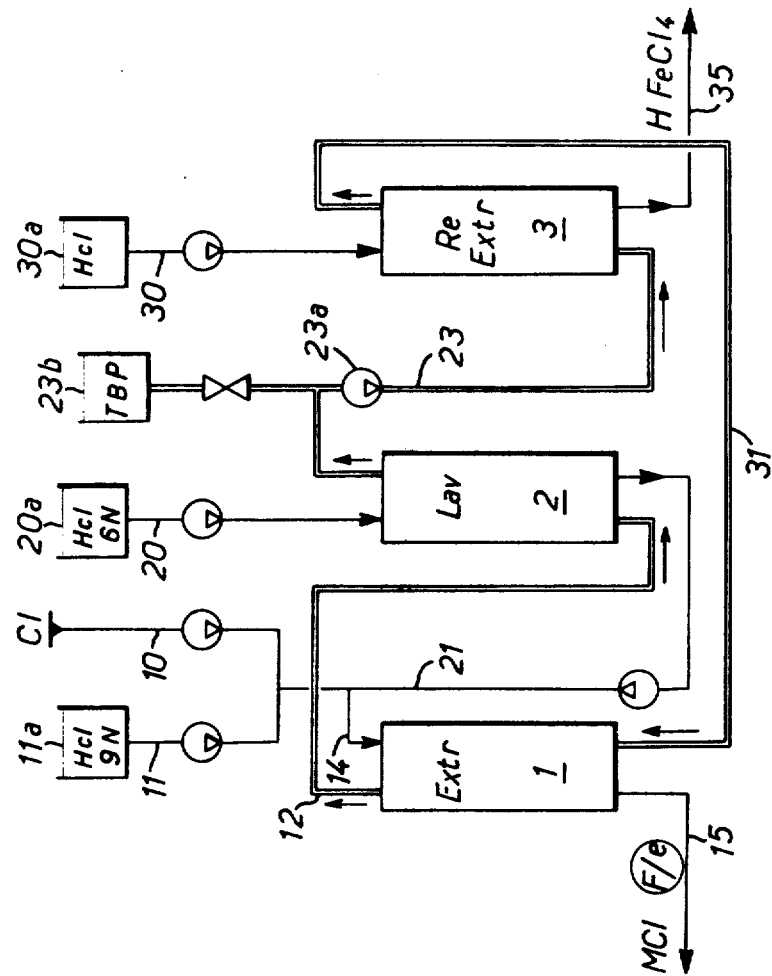

PROCESS FOR TREATING RESIDUES FROM THE ELECTROLYTIC PROCESSING OF ZINC, BY RECOVERY OF THE METALS THEREIN

The invention relates to a process for re-utilising sulphated residues from the electrolytic metallurgy of zinc by selective extraction of the metals contained therein.

The electrolytic metallurgy of zinc is tending to replace the conventional thermal metallurgy because of the advantages it offers, of higher yield, more extensive mechanisation, reduction of manual labour and almost complete elimination of atmospheric pollution. Furthermore, electrolytic metallurgy makes it possible to treat, economically, minerals which are rich in iron and uneconomical when handled by thermal metallurgy. However, this electrolytic metallurgy has the disadvantage of leaving bulky residual material, the mass of which can represent almost one-quarter of the mass of treated mineral, and which is awkward to handle and difficult to dispose of, the disposal causing pollution, whilst storage on dumping grounds is very costly. Furthermore, these residues contain, in varying amounts depending on the origin of the minerals, very diverse metals and especially iron, lead, copper, silver, arsenic, antimony, tin, bismuth, cadmium and germanium, as well as a significant amount of residual zinc. These metals are present in the residues, in the form of sulphates, basic sulphates, oxides, hydrated oxides and the like, depending on the zinc extraction processes appropriate for the various minerals. As a general rule, these residues contain a large amount of iron and of sulphates.

The recovery of the metals contained in these residues has the double advantage of reducing the bulk and the volume of the final residues and of giving metals of which some have a high intrinsic value, of course subject to the condition that the recovery should not be too costly and should give sufficiently pure products for these to have a market value.

However, hitherto, the predominant presence of iron — which is only of value in a high degree of purity — in the metals of the residues has been an obstacle in the recovery of the other metals, which are of higher value. Furthermore, the presence of sulphates in the residues makes it difficult economically to remove the iron.

It is known that the extraction of iron by a solvent operating by cation exchange, such as a carboxylic acid, requires simultaneous neutralisation of the aqueous solution which presents the danger of causing a precipitation of hydroxides because of the high concentration of iron.

It has been proposed to extract the iron, in hydrochloric acid solution, by means of amines (South African Pat. No. 68/4,652, U.S. Pat. Nos. 3,607,236 and 3,446,720, German Pat. No. 1,483,155, and the like). In general, secondary and tertiary amines are preferred. The selectivity, especially with regard to zinc, is mediocre.

The extraction of the iron by tributyl phosphate is used on an industrial scale to extract the iron from hydrochloric acid solutions of iron and nickel, by Messrs. FALCON-BRIDGE NICKEL MINES LTD in CHRISTIANSAND (Norway); the extraction is carried out in a very acid medium, and it has been assumed that the iron is extracted in the form of a complex $HFeCl_4$.

It is known that the extraction of the iron by means of tributyl phosphate requires the presence of a chloride which causes salting-out in the aqueous phase, which can be a chloride of a transition metal or an alkali metal or an alkaline earth metal chloride. Certain chlorides, which are less extractable than iron, are partially extracted with the iron, and these especially include zinc. The alkali metal chlorides and alkaline earth metal chlorides are not extractable by TBP. but enter, as cations, the extracted ferric chloride/hydrochloric acid complexes and can accompany the iron in the extraction process; such is the case with lithium, sodium, potassium, magnesium and calcium. These entrained cations are found in the re-extraction liquor and are objectionable in certain subsequent operations such as the pyrohydrolysis of the ferric chloride and furthermore contaminate the iron oxide.

The invention relates to a process for re-utilising residues from the electrolytic metallurgy of zinc by selective extraction of the metals contained in the residues, which permits substantially complete recovery of the metals contained therein, a substantial reduction in the volume of the final residues, the extraction of the iron in a state of high purity, and efficient concentration of the metals present at a very low content in the residues, whilst the expensive or polluting reactants are re-cycled with low losses.

For this purpose, the invention proposes a process for re-utilising sulphated residues from the electrolytic metallurgy of zinc, by selective extraction of the metals contained in these residues, wherein these metals are re-dissolved in the form of chlorides, characterised by the following sequence of operations:

a. Digestion of the residues, at an elevated temperature, with a measured amount of hydrochloric acid in the presence of calcium chloride in slight stoichiometric excess over the sulphate ions, removal of the insoluble matter by filtration and transfer of the hot solution of chlorides to the next operation.

b. Cooling of the solution of chlorides originating from the operation (a) until lead chloride precipitates, recovery of the precipitated lead chloride and transfer of the solution of chlorides, from which the lead has been removed, to the next operation.

c. Removal of iron chloride from the solution of chlorides originating from operation (b), comprising the following stages:

$c_1$. Extraction of the iron chloride by counter-current circulation of an organic solvent which is selective for iron chloride and is immiscible with water, and separation of the aqueous solution, from which the iron chloride has been removed, from the selective solvent charged with iron chloride accompanied by alkali metal chlorides, alkaline earth metal chlorides and zinc chloride.

$c_2$. Counter-current washing of the selective organic solvent charged with iron chloride originating from ($c_1$), with an aqueous hydrochloric acid solution of at least 3N strength, and separation of the aqueous solution containing the alkali metal chlorides, alkaline earth metal chlorides and zinc chloride, from the washed selective organic solvent.

$c_3$. Counter-current re-extraction of the iron chloride from the washed selective organic solvent originating from ($c_2$) with a dilute solution of hydrochloric acid and separation of an aqueous solution of re-extracted iron chloride, containing a substantially equimolar amount of hydrochloric acid, from the selective organic solvent, from which the iron chloride has been removed, and which is re-cycled to stage ($c_1$), whilst the iron chloride is subjected to a known process for the recovery of iron in the form of ferric oxide.

d. Rendering the solution of chlorides, from which iron has been removed, originating from stage ($c_1$) of operation (c), alkaline with ammonia until silver has been re-dissolved as an ammine complex, recovery of the precipitated metal hydroxides by filtration and transfer of the filtrate to the next operation.

e. Precipitation of silver sulphide by measured addition of an alkali metal sulphide solution, recovery of the silver sulphide and transfer of the solution, from which the silver has been removed, to the next operation.

f. Displacement of the ammonia from the solution originating from operation (e) with a measured amount of lime, recovery of the ammonia intended for operation (d), separation of the precipitated zinc hydroxide, copper hydroxide and cadmium hydroxide and re-cycling of the calcium chloride of the remaining solution to operation (a).

The digestion with hydrochloric acid ensures that the metals present are dissolved with excellent yield, whilst the silica is rendered insoluble in a filtrable form and the sulphates are rendered insoluble in the form of calcium sulphate. The greater part of the lead precipitates in operation (b) in the form of pure chloride which can be digested hot with an alkali metal carbonate to give a utilisable lead carbonate. Operation (c), by virtue of its three stages, ($c_1$) extraction, ($c_2$) washing and ($c_3$) re-extraction, gives a ferric chloride with a very low content of alkali metals, alkaline earth metals and zinc, from which an iron oxide of commercial value can be extracted; in fact, the organic solvents which are selective for iron chloride tend to co-extract the alkali metal chlorides, alkaline earth metal chlorides and zinc chloride in the form of ferric chloride/hydrochloric acid complexes, and the washing in stage ($c_2$) replaces these metals by hydrogen in the ferric chloride/hydrochloric acid complex. Rendering alkaline with ammonia in operation (d) precipitates the majority of the metals, from the solution of chlorides, in the form of hydroxides or oxides (especially arsenic, antimony, bismuth, indium, lead and iron remaining from the preceding extraction operations), whilst the silver, the zinc, the copper and the cadmium remain in the filtrate in the form of ammine complexes; in the precipitate, the metals are in forms and concentrations which lend themselves to economical separation and recovery processes. In operation (e), the silver is recovered by itself in the form of sulphide and in operation (f) two reactants used in large tonnages in the process are recovered and re-cycled, whilst the precipitate of zinc, copper and cadmium hydroxides is recovered in order — depending on the relative concentrations of zinc, copper, and cadmium — to be re-cycled with the zinc mineral or separated into its metal constituents.

Advantageously, the hydrochloric acid used for the digestion in operation (a) is displaced from calcium chloride by a measured amount of sulphuric acid. The sulphuric acid is less expensive and less polluting during storage than the hydrochloric acid.

The digestion is preferably carried out at a temperature between 95° and 115° C, the hydrochloric acid being at a concentration of about 9 N.

For operation (c), the pH of the hydrochloric acid solution used for the re-extraction in stage ($c_3$) is preferably between 0.8 and 3. The aqueous wash solution originating from stage ($c_2$) is advantageously added to the solution of chlorides originating from operation (b) on entering stage ($c_1$). The washing in stage ($c_2$) is preferably carried out with hydrochloric acid at a concentration of about 6 N.

Advantageously, the solution of chlorides originating from operation (b) is acidified by adding concentrated hydrochloric acid in an amount corresponding to 0.5 to 0.9 mol of HCl per mol of iron in the solution. The flow rate of the hydrochloric acid wash solution from stage ($c_2$) is so chosen that the solution of iron chloride re-extracted in stage ($c_3$) contains a substantial equimolar amount of hydrochloric acid. When the solution of chlorides originating from operation (b) is acidified, the flow rate of the wash in stage ($c_2$) and the rate of addition of acidification at the entry to stage ($c_1$) are regulated conjointly so that at the re-extraction exit iron chloride and hydrochloride acid are present in substantially equimolar amounts.

Preferably, in operation (d), the rendering alkaline with ammonia is carried out at a temperature of about 60° C until the pH is about 8. The alkali metal sulphide added in operation (e) is ammonium sulphide in less than 40% stoichiometric excess relative to the silver contained in the filtrate originating from operation (d), in order to avoid conjoint precipitation of copper, cadmium and zinc. The metals recovered in operation (d) are advantageously separated by a known process so as to give metals of commercial purity, whilst the hydroxides of zinc, copper and cadmium precipitated in operation (f) can be re-cycled to the start of the operations of the electrolytic metallurgy of zinc, especially if the copper and cadmium content is relatively low; subsequently, when the enrichment in copper and cadmium at the end of the process is sufficient, the metals are separated.

BRIEF DESCRIPTION OF THE DRAWING

The characteristics and advantages of the invention will furthermore emerge from the description which now follows, accompanied by examples, with reference to the attached drawing which represents the flows of the reactive solutions in the operation of the selective extraction of the iron chloride.

The residues from the electrolytic metallurgy of zinc, in the chosen examples of the process according to the invention, consisted of two types of residues, a basic iron sulphate or jarosite resulting from the separation of the iron, and a lead and calcium sulphate, the so-called plumbeous residue, resulting from the separation of the lead. Their compositions are indicated in table I.

TABLE I

| Content, % | Pb | Fe | Ag | Zn | Cu | In | As | $SiO_2$ | Ca | Cd | $SO_4^{-2}$ |
|---|---|---|---|---|---|---|---|---|---|---|---|
| Jarosite | 1.88 | 27 | 0.017 | 2.81 | 0.37 | <0.01 | 0.164 | 2.72 | 0.75 | 0.01 | 12.50 |
| Plumbeous residue | 13.70 | 3.50 | 0.065 | 2.50 | 0.04 | <0.01 | 0.016 | 8.77 | 10.80 | 0.02 | 14.17 |

EXAMPLE 1

Digestion With 9 N Hydrochloric Acid 1.410 kg of anhydrous calcium chloride, 2.625 liters of water and 1.240 liters of 9 N hydrochloric acid are added to 1.130 kg of jarosite and 0.280 kg of plumbeous residue. The digestion mixture is heated at 100° C for 1 hour. The insoluble matter is filtered off and washed with hot water, and 3.4 liters of a solution of chlorides, and an insoluble material weighing 945g when dry and composed principally of silica, calcium sulphate and various impurities, are obtained.

70g of lead chloride crystallise on cooling the solution of chlorides; the lead chloride crystals are filtered off and washed. Table II shows the balance sheet of the operations.

TABLE II

| Composition | Insoluble matter, % | Material in solution, g/l | Solubilisation yield, % | $PbCl_2$, % |
|---|---|---|---|---|
| Pb | 0.18 | 3.25 | 97.1 | 69.6 |
| Fe | 2.54 | 105 | 92.4 | 0.02 |
| Ag | 0.0015 | 0.08 | 96.2 | <5. g/t |
| Zn | 0.39 | 12.5 | 90.5 | |
| Cu | 0.01 | 1.3 | 97.8 | |
| In | <0.01 | 0.1 | — | |
| As | 0.026 | 0.43 | 98.7 | |
| $SiO_2$ | 5.51 | 0.065 | — | 0.05 |
| Ca | 27.5 | 83.20 | — | 0.37 |
| Cd | 0.01 | 0.03 | — | |
| $SO_4^{-2}$ | 18.31 | 0.024 | — | 1.84 |
| $Cl^-$ | | | | 18.1 |

It will be noted that the solubilisation yields are very high for all the metals and that the lead chloride is very pure which makes it possible either to market it in this form or to digest it hot with sodium carbonate in order to precipitate a lead carbonate which, when calcined, gives an oxide $Pb_3O_4$, which is a pigment having a high commercial value.

EXAMPLE 2

Digestion With Nascent Hydrochloric Acid 1.630 kg of anhydrous calcium chloride, 0.550 kg concentrate of sulphuric acid and 2.740 liters of water are added to 0.800 kg of jarosite and 200g of plumbeous residue. The digestion mixture is heated at 100° C for 1 hour. The insoluble matter is filtered off and washed with hot water. 2.4 liters of chloride solutions are obtained and the insoluble matter weighs 1.350 kg when dry. A control analysis of the insoluble matter shows contents of lead, iron and zinc of 0.1% whilst the silver content is 5 g/tonne, that is to say 0.00005%. Even taking into account that the insoluble matter is of greater weight, it is found that the solubilisation yields are better than in Example 1. The recovery of the lead by crystallisation of the chloride on cooling the filtrate is 80%, as in Example 1.

SEPARATION OF THE IRON

DETAILED DRAWING DESCRIPTION

This separation is carried out in an apparatus represented schematically in the attached drawing. The columns 1, 2 and 3 are counter-current liquid-liquid exchange apparatuses such as mixer/decanter batteries. The organic solvent which is selective for iron chloride is circulated by means of the pump 23a; it comes from the column 2 intended for washing and it is forced through the pipeline 23 towards the column 3 reserved for the re-extraction of the iron. From the re-extraction column, the solvent is directed towards the column 1 reserved for the extraction, via the pipeline 31. On issuing from the column 1, the solvent is directed to the column 2 through the pipeline 12 and is re-cycled on issuing from this column.

The solution of chlorides, cooled and freed from the greater part of the lead chloride, obtained at the end of Examples 1 and 2 is introduced through the pipeline 10, which joins with the pipeline 11 coming from a reservoir 11a for concentrated hydrochloric acid intended for acidifying the solution of chlorides. The pipeline 10 is extended conjointly with the pipeline 21 coming from the wash column 2 through the pipeline 14 for admitting aqueous solution into the column 1. The solution from which the iron has been removed issues from the column 1 through the pipeline 15.

The wash column 2 is fed with hydrochloric acid wash solution 20a through the pipeline 20 and this solution leaves again, in the direction of column 1, through the pipeline 21. The re-extraction column 3 receives a dilute aqueous solution of hydrochloric acid 30a through the pipeline 30 and the re-extracted iron chloride issues through the pipeline 35.

The working cycle is as follows: the selective solvent circulates in a closed circuit in the column in the direction 3, 2, 1, 3 .... In column 1 it is charged with ferric chloride extracted from the solution of chlorides entering at 10, and also entrains principally alkaline earth metal chlorides and zinc chloride. In column 2, the selective solvent is freed from the co-extracted alkaline earth metal chlorides and zinc cloride and the aqueous wash phase returns to extraction column 1 through the pipeline 21. The wash liquor is rather concentrated so as to reduce the re-extraction of the iron chloride. In column 3, the selective solvent brought into contact with the hydrochloric acid solution 30a liberates the ferric chloride.

EXAMPLE 3

The starting material is a solution of chlorides resulting from the operations according to Examples 1 and 2 and containing 95 g/l of iron, 80 g/l of calcium and 10 g/l of zinc and having an acidity of 0.6 N. This solution is admitted through the pipeline 10 at a flow rate V. The battery 1 of mixers/decanters comprises five stages, the battery 2 comprises six stages and the battery 3 comprises eight stages. The selective solvent comprises 50% of tributyl phosphate, 43% of the solvent "SOLVESSO 150" and 7% of isodecanol and is circulated at a flow rate of 2.35 V. The wash solution 20a consists of 6 N HCl passed to column 2 at a flow rate of 0.25 V. The re-extraction solution 30a is a dilute hydrochloric acid solution at pH 2 injected into the column 3 at a flow rate of 1.1 V. No acidification solution 11a as added.

The aqueous solution issuing at 15 (flow rate 1.25 V) contains 2 g/l of iron. The ferric chloride solution issuing at 35 (flow rate 1.1 V) contains 85 g/l of iron, less than 200 mg/l of calcium and 2 mg/l of zinc; the acidity is 1.5 N corresponding stoichiometrically to the 1.5 mols of iron per liter of ferric chloride. The selective solvent circuit contains, at the level of the pipeline 12 (between the column 1 and the column 2) 41 g/l of iron and 7.5 g/l of calcium, whilst after washing 38 g/l of iron and less than 50 mg/l of calcium are found in the pipeline 23. The ferric chloride pyrohydrolyses easily and the ferric oxide obtained, which is practically free from calcium, can be used as a pigment.

EXAMPLE 4

The starting material is a solution of chlorides richer in iron than in the case of example 3; composition: 111 g/l of iron, 71 g/l of calcium, 12.7 g/l of zinc, acidity 0.23 N. This solution has been oxidised with chlorine gases to have all the iron in the Fe III form.

The batteries of mixers/decanters or columns, 1 and 2, comprise six stages and the battery 3 comprises eight stages. The selective organic solvent consists of 30% of tributyl phosphate and 70% of "SOLVESSO 150" solvent and is circulated at a flow rate of 4.65 V, V being, as in Example 3, the flow rate of the solution of chlorides at the inlet 10. This solution is acidified by adding 9 N hydrochloric acid (through the pipeline 11) at a flow rate of 0.18 V. The wash solution consists of 6 N hydrochloric acid passed into the column 2 through the pipeline 20 at a flow rate of 0.23 V. The re-extraction solution 30a consists of hydrochloric acid at pH 1 and is passed into the column 3 through the pipeline 30 at a flow rate of 1.16 V.

The solution of chlorides, from which the iron has been removed, issues through the pipeline 15 at a flow rate of 1.4 V and contains 20 mg/l of iron, with an acidity of 1.2 N. The ferric chloride solution at the exit 35 contains 88 g/l of iron, less than 1 g/l of calcium and 2 mg/l of zinc and its acidity is 1.5 N, corresponding to the stoichiometric equilibrium between ferric chloride and hydrochloric acid in the formation of the complex $HFeCl_4$. The tributyl phosphate solution contains, in pipeline 12, 24.6 g/l of iron and 3.8 g/l of calcium and on issuing from the wash in pipeline 23 contains 23 g/l of iron and less than 250 mg/l of calcium.

EXAMPLE 5

Extraction of the Metals of High Intrinsic Value

The starting material is 10 liters of solutions of chlorides, from which iron has been removed by the operations according to Examples 3 or 4. This solution is heated to about 60° C and gaseous ammonia is added so as to bring the pH to about 8.2. A precipitate of hydroxides weighing 3.46 kg when wet, and 200 g after drying, is recovered. This precipitate contains indium, lead, arsenic and bismuth and is treated by a conventional process for separating the metals. The contents of copper, silver, zinc and lead in the mother liquor and in the ammoniacal filtrate are shown in table III below:

TABLE III

| C in g/l | Cu | Ag | Zn | Pb | $NH_3$ |
|---|---|---|---|---|---|
| Mother liquor | 0.70 | 0.06 | 2.00 | 1.15 | — |
| Filtrate | 0.650 | 0.056 | 2.00 | 0.45 | 40 |

It will be noted that the copper, the silver and the zinc have remained almost quantitatively in solution in the form of ammine complexes.

10 ml of an ammonium sulphide solution containing 14 g/l of sulphur are added to the filtrate, this amount corresponding to a stoichiometric excess of about 30% over the silver; 1 g of silver sulphide containing 550 mg of pure silver is recovered by filtration. The filtrate only contains 0.2 mg/l of silver.

650 g of lime are added to this filtrate and the mixture is heated to near the boiling point. Practically the whole of the ammonia used previously is recovered in the gas phase whilst the metals are recovered in the form of a precipitate of hydroxides of copper, zinc and cadmium which can be re-cycled to the leaching of the zinc mineral or be treated by a conventional separation process if successive re-cycling gives a sufficient enrichment of these hydroxides. The mother liquor contains calcium chloride which can be used for the initial acid digestion after adjusting the concentration, and replaces all or part of the anhydrous calcium chloride in the operations of Examples 1 and 2.

It will be noted that the reactants used in large amount in the process are to the greater part re-cyclable, whether they be calcium chloride, the hydrochloric acid recovered from the pyrohydrolysis of the ferric chloride, the ammonia, and, of course, the selective organic solvent; the non-recycled reactants are essentially lime and sulphuric acid, which are to be found in the waste material in the form of calcium sulphate. Furthermore, the re-cycling of the solutions to the various operations makes it possible to achieve metal extraction yields which approach the solubilisation yields, and these solubilisation yields are above 90% for the majority of the metals and reach 96 to 98% for silver, copper, lead and arsenic.

The application of the process is to the residues from a factory for the electrolytic metallurgy of zinc, producing 100 to 120,000 tonnes of zinc per annum, and currently dumping almost 80,000 tonnes of basic sulphate residues. Using the process, the residues will be denser and non-hydrolysable and will cause little pollution. Furthermore, the process will make it possible to recover, from residues of a composition analogous to the composition quoted above, several thousand tonnes of lead and zinc, almost 15,000 tonnes of iron in the form of ferric oxide pigment, several hundreds of tonnes of copper, almost twenty tonnes of silver and amounts of arsenic, bismuth, indium and cadmium ranging from a few tonnes to several tens of tonnes.

Of course, the invention is not limited to the examples described and is in particular applicable to residues, of various compositions, from the electrolytic metallurgy of zinc. Adapting the concentrations of the reactants or of the amounts used to the contents of the various metals in the residues, or in the solutions, determined by analyses, however does not go outside the scope of the invention.

What is claimed is:

1. A process for treating sulphated residues from the electrolytic processing of zinc, by selective extraction of the metals contained in these residues, comprising
   a. digesting the residues, at an elevated temperature, with a measured amount of hydrochloric acid in the presence of calcium chloride in slight stoichiometric excess over sulphate ions, removing the insoluble matter by filtration and recovering the elevated temperature solution of chlorides;
   b. cooling the solution of chlorides until lead chloride precipitates, recovering precipitated lead chloride;
   c. removing iron chloride from the solution of chloride from which the lead has been removed, by the following stages:
   $c_1$. extracting the iron chloride by counter-current circulation of an organic solvent which is selective for iron chloride and is immiscible with water, and separating the aqueous solution, from which the iron chloride has been removed, from the selective solvent charged with iron chloride accompanied with alkali metal chlorides, alkaline earth metal chlorides and zinc chloride;

$c_2$. counter-currently washing the selective organic solvent charged with iron chloride, with an aqueous hydrochloric acid solution of at least 3N strength, and separating the aqueous solution containing the alkali metal chlorides, alkaline earth metal chlorides and zinc chloride, from the washed selective organic solvent;

$c_3$. counter-current re-extracting the iron chloride from the washed selective organic solvent with a dilute solution of hydrochloric acid and separating an aqueous solution of re-extracted iron chloride containing a substantially equimolar amount of hydrochloric acid from the selective organic solvent, from which the iron chloride has been removed, and which is re-cycled to stage ($c_1$), while recovering iron in the form of ferric oxide;

d. rendering the solution of chlorides, from which iron has been removed, emanating from stage ($c_1$), alkaline with ammonia until silver has been re-dissolved as an ammine complex, recovering the precipitated metal hydroxides by filtration;

e. precipitating silver sulphide by measured addition of sulphide solution, recovering the silver sulphide;

f. displacing the ammonia from the solution emanating from operation (e) with a measured amount of lime, recovering the ammonia necessary for operation (d), separating the precipitated zinc hydroxide, copper hydroxide and cadmium hydroxide and re-cycling the calcium chloride of the remaining solution in operation (a).

2. Process according to claim 1, wherein the hydrochloric acid used in operation (a) is displaced from calcium chloride by a measured amount of sulphuric acid.

3. Process according to claim 1, wherein operation (a) is carried out at a temperature of between 95° and 115° C, the hydrochloric acid being at a concentration of about 9 N.

4. Process according to claim 1, wherein, in stage ($c_3$), the pH of the hydrochloric acid re-extraction solution is between 0.8 and 3.

5. Process according to claim 1, wherein, in operation (c), the aqueous wash solution resulting from stage ($c_2$) is added to the solution of chlorides resulting from operation (b) at the entry to stage ($c_1$).

6. Process according to claim 5, wherein the aqueous solution of hydrochloric acid for the wash in stage ($c_2$) is at a concentration of about 6 N.

7. Process according to claim 5, wherein the solution of chlorides resulting from operation (b) is acidified by adding concentrated hydrochloric acid in an amount corresponding to 0.5 to 0.9 mol of hydrochloric acid per mol of iron present in the solution.

8. Process according to claim 5, wherein the flow rate of the hydrochloric acid wash solution of stage ($c_2$) is so chosen that the solution of iron chloride extracted in stage ($c_3$) contains a substantially equimolar amount of hydrochloric acid.

9. Process according to claim 7, wherein the flow rate of the hydrochloric acid wash solution in stage ($c_2$) and the flow rate of concentrated hydrochloric acid added to the solution of chlorides before depletion in stage ($c_1$) are conjointly adjusted so that the solution of iron chloride re-extracted in stage ($c_3$) contains a substantially equimolar amount of hydrochloric acid.

10. Process according to claim 1, wherein, in operation (d), the mixture is rendered alkaline with ammonia at a temperature of about 60° C until the pH is about 8.

11. Process according to claim 1, wherein the sulphide added in operation (e) is ammonium sulphide in a stoichiometric excess of less than 40% relative to the silver contained in the filtrate issuing from operation (c).

12. Process according to claim 1, further comprising redissolving the metal hydroxides recovered in operation (d) and separating them quasi-quantitatively.

13. Process according to claim 1, further comprising redissolving the hydroxydes of zinc, copper and cadmium separated in operation (f) and recycling the solution obtained to the electrolytic process.

14. Process according to claim 1, wherein the hydroxides of zinc, copper and cadmium separated in operation (f) are separated when they are in sufficiently large quantities.

* * * * *